(12) United States Patent
Sasaki et al.

(10) Patent No.: US 11,180,654 B2
(45) Date of Patent: Nov. 23, 2021

(54) COMPOSITION, FILM FORMED FROM THE COMPOSITION, SLIDING MEMBER HAVING THE FILM, AND METHOD FOR PRODUCING THE SAME

(71) Applicant: DuPont Toray Specialty Materials Kabushiki Kaisha, Tokyo (JP)

(72) Inventors: Takahiko Sasaki, Utsunomiya (JP); Tetsuji Yamaguchi, Utsunomiya (JP)

(73) Assignee: DUPONT TORAY SPECIALTY MATERIALS KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/972,821

(22) PCT Filed: May 31, 2019

(86) PCT No.: PCT/JP2019/021669
§ 371 (c)(1),
(2) Date: Dec. 7, 2020

(87) PCT Pub. No.: WO2019/239917
PCT Pub. Date: Dec. 19, 2019

(65) Prior Publication Data
US 2021/0246310 A1    Aug. 12, 2021

(30) Foreign Application Priority Data

Jun. 11, 2018 (JP) .............................. JP2018-111105

(51) Int. Cl.
| | | |
|---|---|---|
| *C08L 79/08* | (2006.01) | |
| *C08K 3/04* | (2006.01) | |
| *C08J 5/18* | (2006.01) | |
| *C08K 3/14* | (2006.01) | |
| *C08K 7/18* | (2006.01) | |
| *C10M 125/02* | (2006.01) | |
| *C10M 125/08* | (2006.01) | |
| *C10N 20/06* | (2006.01) | |
| *C10N 30/06* | (2006.01) | |

(52) U.S. Cl.
CPC ................. *C08L 79/08* (2013.01); *C08J 5/18* (2013.01); *C08K 3/042* (2017.05); *C08K 3/14* (2013.01); *C08K 7/18* (2013.01); *C10M 125/02* (2013.01); *C10M 125/08* (2013.01); *C10M 2201/041* (2013.01); *C10M 2217/0443* (2013.01); *C10N 2020/06* (2013.01); *C10N 2030/06* (2013.01)

(58) Field of Classification Search
CPC ........ C04B 35/5626; C04B 2235/3891; C04B 2235/425; C04B 35/547; C04B 2235/3847; C04B 35/522; C10M 103/00; C10M 103/02; C10M 107/24; C10M 107/32; C10M 107/40; C10M 125/08; C10M 135/20
See application file for complete search history.

(56) References Cited

U.S. PATENT DOCUMENTS

| | | | | |
|---|---|---|---|---|
| 6,305,847 B1 * | 10/2001 | Tanaka | ................. | C10M 125/22 384/297 |
| 2012/0101011 A1 * | 4/2012 | Makino | ................ | C10M 125/00 508/100 |
| 2018/0362873 A1 * | 12/2018 | Sasaki | ................. | C10M 107/44 |

FOREIGN PATENT DOCUMENTS

| | | |
|---|---|---|
| CN | 105754453 A | 7/2016 |
| CN | 107474382 A | 12/2017 |
| CN | 107546710 A | 1/2018 |
| CN | 107619533 A | 1/2018 |
| CN | 107915983 A | 4/2018 |
| JP | H0270770 A | 3/1990 |
| JP | 2015 124338 A | 7/2015 |

* cited by examiner

*Primary Examiner* — Vishal V Vasisth
(74) *Attorney, Agent, or Firm* — Lorenz & Kopf, LLP

(57) ABSTRACT

A film is formed by use of a composition containing (A) a binder resin, (B) a hard particle, and (C) a solid lubricant selected from the group containing molybdenum disulfide and graphite, wherein the composition contains tungsten carbide as the hard particle, and wherein weight ratio of (B) the hard particles and (C) the solid lubricant, (B)/(C), is in the range of 1 to 3.

20 Claims, No Drawings

COMPOSITION, FILM FORMED FROM THE COMPOSITION, SLIDING MEMBER HAVING THE FILM, AND METHOD FOR PRODUCING THE SAME

This application is a 371 of PCT/JP2019/021669, filed May 31, 2019.

TECHNICAL FIELD

The present invention relates to a composition that provides a lubricating film having excellent sliding properties. Furthermore, the present invention relates to a film formed from the composition, a sliding member having the film, and a method of manufacturing the same.

BACKGROUND ART

Film-forming compositions containing solid lubricants to improve the sliding properties of component surfaces are used in various applications such as industrial machines, construction machines and automobiles. For example, JP2017-201165A discloses a piston having a skirt portion for an internal combustion engine, and has a two-layer film consisting of an inner layer and an outer layer, and the inner layer contains an organic binder, a solid lubricant and hard material particles. However, in the above-mentioned structure, since a two-layer film has to be formed, the manufacturing steps are increased and complicated. Moreover, the lubricating film formed from the conventional film-forming composition containing an organic binder, a solid lubricant and hard particles might not be applicable in the scene where more severe sliding performance is required.

CITATION LIST

Patent Literature

[PTL 1] JP2017-201165A

SUMMARY OF INVENTION

Technical Problem

An object of the present invention is to provide a composition capable of forming a sliding film having excellent properties on the surface of a member used in machines of various industrial fields and automobiles.

Solution to Problem

The present inventors have created the invention based on the finding that a film having higher sliding performance can be formed by using a composition containing a binder resin, a solid lubricant and hard particles comprising tungsten carbide, in which the weight ratio of the solid lubricant to the hard particles is set within a specific range.

The first aspect of the invention relates to a composition comprising (A) a binder resin; (B) a hard particle; and (C) a solid lubricant selected from the group consisting of molybdenum disulfide and graphite; wherein the composition comprises tungsten carbide as the hard particle, and wherein weight ratio of (B) the hard particles and (C) the solid lubricant, (B)/(C), is in the range of 1 to 3.

The second aspect of the invention relates to a film made from the above composition.

The third aspect of the invention relates to a sliding member having a lubricating film made from the above composition.

The forth aspect of the invention relates to a method for forming a lubricating film on surface of a member, comprising the steps of: (I) preparing a composition comprising (A) a binder resin, (B) a hard particle, (C) a solid lubricant selected from the group consisting of molybdenum disulfide and graphite, wherein the composition comprises tungsten carbide as the hard particle, and wherein weight ratio of (B) the hard particles and (C) the solid lubricant, (B)/(C), is in the range of 1 to 3; (II) applying the composition on surface of a member; and (III) heat-curing the applied composition, thereby forming a lubricating film on surface of the part.

Effects of Invention

According to the composition of the present invention, it is possible to form a film having sliding performance superior to conventional films, particularly, in load resistance and wear resistance.

DESCRIPTION OF EMBODIMENTS (A) Binder Resin

The binder resin used in the present invention is a resin which forms a lubricating film as a heat resistant resin and has a function as a binder for supporting a solid lubricant described later. Resins which can be used include, for example, polyamideimide, polyimide, epoxy resin, phenol resin, polyamide, polybenzimidazole, polyphenyl sulfonate and polyether ether ketone, and one or more of these may be contained. Preferably, the binder resin contains polyamide-imide or polyimide. More preferably, the binder resin contains polyamideimide.

The content of the binder resin is 10 to 40% by weight, preferably 20 to 30% by weight, based on the weight of the whole composition.

(B) Hard Particles

The hard particles used in the present invention have the function of improving the load resistance of the film and improving the wear resistance. The hard particles that can be used include tungsten carbide, titanium carbide, zirconium carbide, zirconium oxide, tungsten disulfide, molybdenum carbide, tungsten disilicide, titanium nitride and zirconium nitride, and one or more of these may be contained. The hard particles used in the present invention contain at least tungsten carbide.

When other hard particles in addition to tungsten carbide are contained as well, it is preferable that the content of tungsten carbide is 40% by weight or more based on the total weight of the hard particles. The other particles are most preferably titanium nitride.

The average particle diameter of the hard particles of the present invention is preferably 0.1 to 2.0 µm, and particularly preferably 0.1 to 1.5 µm. The average particle diameter of the hard particles can be measured by laser diffraction scattering method.

The content of the hard particles depends on the compounding amount of the solid lubricant described later, but as an example, it is 70 to 140 parts by weight with respect to 100 parts by weight of the binder resin.

(C) Solid Lubricant

The solid lubricant used in the present invention is molybdenum disulfide or graphite. The solid lubricant has a function to improve the sliding property of the film, and in particular, molybdenum disulfide and graphite are used in the composition of the present invention from the viewpoint of forming a film having the sliding property of good wear resistance. Among the two, graphite is particularly preferred in view of lowering the coefficient of friction and further imparting abration resistance.

Although the content of the solid lubricant depends on the blending amount of the hard particles, but as an example, it is 40 to 70 parts by weight with respect to 100 parts by weight of the binder resin.

The average particle diameter of the solid lubricant of the present invention can be measured by laser diffraction scattering method. The average particle diameter of the solid lubricant is preferably 0.1 to 15.0 μm, and particularly preferably 1.0 to 10.0 μm.

In the present invention, it is important that the weight ratio of the component (B) to the component (C) ((B)/(C)) be in the range of 1 to 3. If the weight ratio of the two components is 1 or more, the ratio of hard particles contributing to wear resistance becomes larger than that of the solid lubricant contributing to the sliding property in the film, and wear resistance and load resistance are greatly improved. In particular, the weight ratio of both components is preferably 1.2 or more. On the other hand, if the weight ratio of both components exceeds 3, it is not preferable because the coefficient of friction becomes too large. More preferably, the weight ratio of the two components is 2.5 or less.

(D) Solvent

The composition of the present invention can contain a solvent for the purpose of improving coating properties and the like. The solvent can be selected depending on the type of binder resin. Usable solvents include, for example, ketones such as acetone, methyl ethyl ketone, methyl isobutyl ketone and cyclohexanone; esters such as methyl acetate and ethyl acetate; aromatic hydrocarbons such as toluene and xylene; organic halogen compounds such as methyl chloroform, trichloroethylene and trichlorotrifluoroethane; N-methyl-2-pyrrolidone (NMP), N-ethyl-2-pyrrolidone (NEP), 1,3-Dimethyl-2-imidazolidinone (DMI), γ-butyrolactone (GBL), 3-methoxy-N,N-dimethylpropanamide, methylisopyrrolidone (MIP), dimethylformaldehyde (DMF), dimethylacetaldehyde (DMAC) and so on. The solvent may be one or mixed of two or more. Particularly preferred solvents are NEP, DMI, GBL and 3-methoxy-N,N-dimethylpropanamide.

(E) Other Additives

The coating composition of the present invention may further contain, if necessary, one or more of a UV absorber, a light stabilizer, an antioxidant, a thermal polymerization inhibitor, a leveling agent, a deformer, a thickener, an anti-settling agent, pigments (organic colored pigments, inorganic pigments), colored dyes, infrared absorbers, fluorescent whitening agents, dispersants, conductive fine particles, antistatic agents, antifogging agents, coupling agents as long as the object of the present invention is not impaired.

The composition of the present invention can be produced by appropriately mixing the components (A) to (C) and the various optional components described above.

Film

The second aspect of the present invention relates to a film made from the above-mentioned composition. The film is formed by applying the composition described above onto the surface of a member and then heat curing the applied composition. The method of forming the film will be described later as the fourth aspect of the present invention. The film of the present invention is a sliding film in which hard particles and a solid lubricant are dispersed in a binder resin, and the film thickness is 1 to 50 μm, preferably 5 to 30 μm.

The third aspect of the present invention relates to a sliding member having a lubricating film made from the above composition. The sliding member may be a swash plate of a compressor, an engine tappet (valve lifter), a camshaft, a crankshaft, an engine metal, an engine piston, a piston ring, a gear, a door lock, a brake shim or a brake clip.

The fourth aspect of the present invention is a method of forming a lubricating film on a surface of a member, and includes the following steps (I) to (III).

(i) Step (I)

Step (I) is a step of preparing a composition containing (A) a binder resin, (B) a hard particle, and (C) a solid lubricant selected from the group consisting of molybdenum disulfide and graphite, in which the composition comprises tungsten carbide as the hard particle and in which weight ratio of (B) the hard particles and (C) the solid lubricant, (B)/(C), is in the range of 1 to 3. The composition is as described above as the first aspect of the present invention.

(ii) Step (II)

Step (II) is a step of applying the composition prepared in step (I) onto the surface of a member. The composition may be applied by dipping, spin coating, flow coating, spraying, bar coating, gravure coating, roll coating, blade coating, screen printing, air knife coating and so on. The thickness of the coating film is not particularly limited, but a thickness of 1 to 50 μm is preferable, and a thickness of 5 to 30 μm is more preferable.

(iii) Step (III)

Step (III) is a step of forming a lubricating film on the surface of the member by heat curing the composition applied in step (II). Thermal curing can be performed by heating in an oven or the like. When heat-curing the applied composition, the solvent in the composition can be removed in the first phase of heating, and it can be cured by cross-linking reaction in the second phase of heating. For example, the first phase of heating may be performed at 60 to 100° C. for 5 to 30 minutes, and then the second phase of heating may be performed at 180 to 250° C. for 20 to 120 minutes.

EXAMPLES

The present invention is illustrated by, but is not limited to, the following examples. The raw materials used in the examples are shown in Table 1. The "average particle diameter" in Table 1 is the average particle diameter of each particle measured by laser diffraction scattering method.

TABLE 1

| Component | Compound name | Property | Manufactuer |
|---|---|---|---|
| A-1 | Polyamideimide | Molecular weight: about 20,000 | Hitachi Chemical Company, Ltd. |
| A-2 | Epoxy resin | Molecular weight: about 400, Epoxy equivalent: 184-194 | Mitsubishi Chemical Corp. |
| B-1 | Tungsten carbide particle | Average particle diameter: 0.7 μm | Japan New Metals Co., Ltd. |
| B-2 | Tungsten carbide particle | Average particle diameter: 1.27 μm | Japan New Metals Co., Ltd. |
| B-3 | Titanium nitride particle | Average particle diameter: 0.7 μm | Japan New Metals Co., Ltd. |
| B-4 | Alumina particle | Average particle diameter: 0.4 μm | Sumitomo Chemical Co., Ltd. |

TABLE 1-continued

| Component | Compound name | Property | Manufactuer |
|---|---|---|---|
| C-1 | Graphite | Average particle diameter: 4-5.5 μm | Graphit Kropfmühl GmbH |
| D-1 | γ-butyrolactone | — | Mitsubishi Chemical Corp. |
| D-2 | N-ethyl-2-pyrrolidone | — | Sankyo Chemical Co., Ltd. |
| E-1 (deformer) | Copolymer of ethyl methyl siloxane and 2-phenylpropyl methyl siloxane | Refractive index: 1.46, Dynamic viscosity: 1,400 cSt | Dow Corning Toray Co., Ltd. |

Example 1

A polyamideimide resin solution (solid content about 35 wt %) containing polyamideimide resin dissolved in N-ethyl-2-pyrrolidone (NEP) was prepared by synthesizing polyamideimide resin in NEP. An epoxy resin was added to the polyamideimide resin solution so that the resulting binder resin solution contains 87 parts by weight of the polyamideimide resin and 13 parts by weight of the epoxy resin. In this binder resin solution, graphite, which is a powdery solid lubricant, and tungsten carbide particles, which are hard particles, are blended so that the resulting composition contains 127 parts by weight of tungsten carbide particles and 55.7 parts by weight of graphite based on 100 parts by weight of the total binder resin, and then 0.7 parts by weight of a deformer was further added. The composition was mixed and dispersed at room temperature. The mixture was diluted with N-ethyl-2-pyrrolidone (NEP) to a solid content concentration of 57 wt % to formulate a coating composition used for the evaluation test. The coating composition was applied on the surface of a SRV cylindrical disk test piece (size: φ24×7.9 mm, Material: 100Cr6 (equivalent to SUJ2) Optimol Instruments Prutechnik GmbH by use of a screen printing plate (Mesh Corporation) so that the film thickness after firing was 15±5 μm, and the solvent was removed by heating in a circulating oven at 80° C. for 20 minutes. Thereafter, firing was performed at 220° C. for 20 minutes to obtain a test piece.

Examples 2 to 8 and Comparative Examples 1 to 5

The same procedure as in Example 1 was carried out except using the components and the amount (parts by weight) shown in Table 2 or Table 3, to obtain test pieces. The test pieces obtained in the Examples and Comparative Examples were subjected to load resistance test (reciprocal sliding test) described later, and the results are shown in Table 2 or Table 3. As shown in Table 2, the test pieces according to the example of the present invention had a high load (N) to seizure compared to the comparative example.

TABLE 2

| | | Examples | | | | | | | |
|---|---|---|---|---|---|---|---|---|---|
| | | 1 | 2 | 3 | 4 | 5 | 6 | 7 | 8 |
| Binder resin | A-1 | 87.0 | 87.0 | 87.0 | 87.0 | 87.0 | 87.0 | 87.0 | 87.0 |
| | A-2 | 13.0 | 13.0 | 13.0 | 13.0 | 13.0 | 13.0 | 13.0 | 13.0 |
| Hard particles | B-1 | — | 72.2 | — | — | — | — | — | — |
| | B-2 | 127.0 | — | 72.7 | 127.0 | 65.2 | 43.5 | 65.2 | 65.2 |
| | B-3 | — | — | — | — | 72.2 | 52.5 | 72.2 | — |
| | B-4 | — | — | — | — | — | — | — | 17.4 |
| Solid lubricant | C-1 | 55.7 | 49.6 | 49.6 | 55.7 | 55.7 | 55.7 | 55.7 | 55.7 |
| Additive | E-1 | 0.7 | 0.7 | 0.7 | 0.7 | 0.7 | 0.7 | 0.7 | 0.7 |
| Solvent | D-1 | — | — | — | — | — | — | — | — |
| | D-2 | 210.9 | 210.9 | 210.9 | 210.9 | 210.9 | 210.9 | 210.9 | 210.9 |
| Total | | 493.6 | 433.4 | 433.9 | 494.3 | 504.7 | 463.3 | 504.7 | 449.9 |
| Binder content (%) | | 20 | 23 | 23 | 20 | 20 | 22 | 20 | 22 |
| Tungsten carbide content (%) | | 100 | 100 | 100 | 100 | 47 | 45 | 47 | 79 |
| Ratio of (B)/(C) | | 2.28 | 1.46 | 1.46 | 2.28 | 2.47 | 1.72 | 2.47 | 1.48 |
| Solid content (%) | | 57.3 | 51.3 | 51.4 | 57.3 | 58.2 | 54.5 | 58.2 | 53.1 |
| Load resistance Load to seizure (N) | | 2,000 | 2,000 | 1,480 | 2,000 | 2,000 | 1,540 | 2,000 | 1,950 |

TABLE 3

| | | Comparative Examples | | | | |
|---|---|---|---|---|---|---|
| | | 1 | 2 | 3 | 4 | 5 |
| Binder resin | A-1 | 87.0 | 87.0 | 87.0 | 87.0 | 87.0 |
| | A-2 | 13.0 | 13.0 | 13.0 | 13.0 | 13.0 |
| Hard particles | B-1 | — | — | — | — | — |
| | B-2 | — | 37.4 | 43.5 | — | — |
| | B-3 | — | — | — | — | 65.2 |
| | B-4 | — | — | — | 34.8 | 17.4 |
| Solid lubricant | C-1 | 55.7 | 49.6 | 49.6 | 55.7 | 55.7 |
| Additive | E-1 | 0.8 | 0.8 | 0.7 | 0.8 | 0.8 |
| Solvent | D-1 | 210.9 | — | — | — | — |
| | D-2 | — | 210.9 | 210.9 | 210.9 | 210.9 |
| Total | | 368.8 | 400.9 | 406.1 | 403.6 | 451.4 |
| Binder content (%) | | 27 | 25 | 25 | 25 | 22 |

TABLE 3-continued

|  | Comparative Examples | | | | |
| --- | --- | --- | --- | --- | --- |
|  | 1 | 2 | 3 | 4 | 5 |
| Tungsten carbide content (%) | 0 | 100 | 100 | 0 | 0 |
| Ratio of (B)/(C) | 0 | 0.74 | 0.88 | 0.63 | 1.48 |
| Solid content (%) | 42.4 | 47.0 | 47.7 | 47.4 | 52.9 |
| Load resistance Load to seizure (N) | 650 | 800 | 1,070 | 1,130 | 1,085 |

[Evaluation Method] Load Resistance (Reciprocal Sliding Test)

Using the SRV friction and wear tester (Optimol Instruments Prutechnik GmbH, product name: oscillation friction and wear tester Model SRV5), the load resistance was evaluated by the method in which the SRV cylinder reciprocated on the surface of the SRV disc test piece. The SRV disc test piece was 24 mm in diameter and 7.9 mm in height (Optimol Instruments Prutechnik GmbH, material: 100Cr6 (equivalent to SUJ2)) and the corresponding cylinder was φ15×22 mm SRV cylinder (Optimol Instruments Prutechnik GmbH, material: 100Cr6 (equivalent to SUJ2)). The SRV disk on which a film made of the composition of the present invention was formed was set on the test bed of the SRV5 tester, and 0.1 g of an engine oil (Exxon Mobil, chemically synthesized oil for gasoline and diesel engines 10W-30 SM/CF) was dropped. The SRV cylinder was pressed with a load of 20 N, and after sliding for 1 minute at a speed of 30 Hz and a sliding distance of 2 mm, the load was increased by 30 N every 2 minutes up to 2,000 N while sliding, to measure the seizure load. Specifically, the load before the coefficient of friction became 0.15 or more was taken as the seizure load.

What is claimed is:

1. A composition, comprising:
   (A) a binder resin;
   (B) a hard particle comprising tungsten carbide having an average particle diameter of from 0.7 to 1.27 μm measured by laser diffraction scattering; and
   (C) a solid lubricant selected from the group consisting of molybdenum disulfide and graphite; wherein weight ratio of (B) the hard particles and (C) the solid lubricant, (B)/(C), is of from 1.46 to 2.47.

2. A composition according to claim 1, wherein the solid lubricant is graphite.

3. A composition according to claim 1, wherein the hard particle further comprises, in addition to tungsten carbide, at least one selected from the group consisting of titanium carbide, zirconium carbide, zirconium oxide, tungsten disulfide, molybdenum carbide, tungsten disilicide, titanium nitride and zirconium nitride and combinations thereof.

4. A composition according to claim 3, wherein content of tungsten carbide is not less than 40 wt % based on total weight of the hard particles.

5. A composition according to claim 1, wherein the binder resin is selected from the group consisting of polyamideimide, polyimide, epoxy resin, phenol resin, polyamide, polybenzimidazole, polyphenyl sulfonate and polyether ether ketone and combinations thereof.

6. A composition according to claim 1, comprising a polyamideimide as the binder resin.

7. A composition according to claim 1, further comprising (D) a solvent, wherein the solvent is selected from the group consisting of N-ethyl-2-pyrrolidone, 1,3-Dimethyl-2-imidazolidinone, λ-butyrolactone and 3-methoxy-N,N-dimethyl-propanamide and combinations thereof.

8. A film made from the composition of claim 1.

9. A sliding member having a lubricating film made from the composition of claim 1.

10. A sliding member according to claim 9, wherein the sliding member is a swash plate of a compressor, an engine tappet, a camshaft, a crankshaft, an engine metal, an engine piston, a piston ring, a gear, a door lock, a brake shim or a brake clip.

11. A method for forming a lubricating film on surface of a member, comprising the steps of:
   (I) preparing a composition comprising (A) a binder resin, (B) a hard particle comprising tungsten carbide having an average particle diameter of from 0.7 to 1.27 μm, and (C) a solid lubricant selected from the group consisting of molybdenum disulfide and graphite, wherein the composition comprises tungsten carbide as the hard particle, and wherein weight ratio of (B) the hard particles and (C) the solid lubricant, (B)/(C), is of from 1.46 to 2.47;
   (II) applying the composition on surface of a member; and
   (III) heat-curing the applied composition, thereby forming a lubricating film on surface of the member.

12. The composition of claim 1 wherein the binder resin comprises a polyamideimide and an epoxy resin.

13. The composition of claim 12 wherein the polyamide-imide has a molecular weight of about 20,000.

14. The composition of claim 13 wherein the epoxy resin has a molecular weight of about 400 and an epoxy equivalent of 184-194.

15. The composition of claim 12 wherein the epoxy resin has a molecular weight of about 400 and an epoxy equivalent of 184-194.

16. A composition comprising:
   (A) a binder resin comprising a polyamideimide and an epoxy resin;
   (B) a hard particle that is:
      from 45 to 100 weight percent of tungsten carbide having an average particle diameter of from 0.7 to 1.27 μm measured by laser diffraction scattering, based on a total weight of the hard particle;
      from 0 to 55 weight percent of titanium nitride having an average particle diameter of 0.7 μm measured by laser diffraction scattering, based on a total weight of the hard particle; and
      from 0 to 21 weight percent of alumina having an average particle diameter of 0.4 μm measured by laser diffraction scattering, based on a total weight of the hard particle; and
   (C) graphite having an average particle size of 4 to 5.5 μm measured by laser diffraction scattering, wherein a weight ratio of (B) the hard particles and (C) the graphite, (B)/(C), is of from 1.46 to 2.47.

17. The composition of claim 16 wherein the polyamide-imide has a molecular weight of about 20,000 and the epoxy resin has a molecular weight of about 400 and an epoxy equivalent of 184-194.

18. The composition of claim 17 wherein
the tungsten carbide is present in an amount of from 43.5 to 127 parts by weight per 100 parts by weight of the binder resin;
the titanium nitride is present in an amount of from 0 to 72.2 parts by weight per 100 parts by weight of the binder resin; and
the alumina is present in an amount of from 0 to 17.4 parts by weight per 100 parts by weight of the binder resin.

19. The composition of claim 1 wherein
the tungsten carbide is present in an amount of from 43.5 to 127 parts by weight per 100 parts by weight of the binder resin;
the titanium nitride is present in an amount of from 0 to 72.2 parts by weight per 100 parts by weight of the binder resin; and
the alumina is present in an amount of from 0 to 17.4 parts by weight per 100 parts by weight of the binder resin.

20. The composition of claim 1 wherein from the hard particle comprises 100 weight percent of tungsten carbide having the average particle diameter of from 0.7 to 1.27 μm measured by laser diffraction scattering, based on a total weight of the hard particle.

\* \* \* \* \*